US012218352B2

(12) United States Patent
Dai et al.

(10) Patent No.: US 12,218,352 B2
(45) Date of Patent: Feb. 4, 2025

(54) LITHIUM FLUORIDE-CONTAINING COATINGS FOR CATHODE ACTIVE MATERIALS IN LI-ION BATTERIES

(71) Applicant: Apple Inc., Cupertino, CA (US)

(72) Inventors: Hongli Dai, Los Altos, CA (US); Huiming Wu, San Jose, CA (US); Chi-Kai Lin, Sunnyvale, CA (US); Michael J. Erickson, San Jose, CA (US); Martin Bettge, Santa Clara, CA (US); Xiaoping Wang, Naperville, IL (US); Yan Li, Westmont, IL (US); Yanjie Cui, Arlington Heights, IL (US); James A. Gilbert, Bolingbrook, IL (US); Zhenzhen Yang, Godfrey, IL (US); Anh D. Vu, Lemont, IL (US); Arthur Jeremy Kropf, Westmont, IL (US); Hakim H. Iddir, Hoffman Estates, IL (US); Christopher S. Johnson, Naperville, IL (US); John David Carter, Bolingbrook, IL (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 17/226,511

(22) Filed: Apr. 9, 2021

(65) Prior Publication Data

US 2021/0320298 A1 Oct. 14, 2021

Related U.S. Application Data

(60) Provisional application No. 63/007,781, filed on Apr. 9, 2020.

(51) Int. Cl.
*H01M 4/58* (2010.01)
*H01M 4/04* (2006.01)
(Continued)

(52) U.S. Cl.
CPC ......... *H01M 4/582* (2013.01); *H01M 4/0471* (2013.01); *H01M 4/505* (2013.01); *H01M 4/525* (2013.01); *H01M 10/0525* (2013.01)

(58) Field of Classification Search
None
See application file for complete search history.

(56) References Cited

U.S. PATENT DOCUMENTS

2010/0099027 A1* 4/2010 Kikuya .............. C01G 45/1228
429/223
2017/0263917 A1 9/2017 Dai et al.
(Continued)

*Primary Examiner* — Maria Laios
*Assistant Examiner* — Angela J Martin
(74) *Attorney, Agent, or Firm* — BakerHostetler (57) ABSTRACT

The disclosure provides a plurality of particles. Each particle may include a material comprising 0.95 to 1.30 mole fraction Li, at least 0.60 and less than 1.00 mole fraction Co, up to 10,000 ppm Al, 1.90 to 2.10 mole fraction O, and up to 0.30 mole fraction M, where M is at least one element selected from B, Na, Mg, P, Ti, Ca, V, Cr, Fe, Mn, Ni, Cu, Zn, Al, Sc, Y, Ga, Zr, Ru, Mo, La, Si, Nb, Ge, In, Sn, Sb, Te, and Ce. Each particle may also include a surface composition comprising a mixture of LiF and a metal fluoride. An amount of fluorine (F) is greater than 0 and less than or equal to 5000 ppm. The metal fluoride comprises a material selected from the group consisting of $AlF_3$, $CaF_2$, $MgF_2$, and $LaF_2$. The surface composition may also include a metal oxide comprising a material selected from the group consisting of $TiO_2$, $MgO$, $La_2O_3$, $CaO$, and $Al_2O_3$. An amount of the metal oxide is greater than 0 and less than or equal to 20000 ppm.

20 Claims, 8 Drawing Sheets

(51) Int. Cl.
 H01M 4/50 (2010.01)
 H01M 4/505 (2010.01)
 H01M 4/52 (2010.01)
 H01M 4/525 (2010.01)
 H01M 10/05 (2010.01)
 H01M 10/0525 (2010.01)

(56) References Cited

U.S. PATENT DOCUMENTS

| | | |
|---|---|---|
| 2017/0263928 A1 | 9/2017 | Dai et al. |
| 2017/0263929 A1 | 9/2017 | Wu et al. |
| 2018/0062156 A1 | 3/2018 | Wu et al. |
| 2018/0079655 A1 | 3/2018 | Dai et al. |
| 2018/0123117 A9 | 5/2018 | Dai et al. |
| 2018/0257947 A9 | 9/2018 | Dai et al. |
| 2020/0340965 A1* | 10/2020 | Thornes ............. G01N 33/0052 |

* cited by examiner

LITHIUM FLUORIDE-CONTAINING COATINGS FOR CATHODE ACTIVE MATERIALS IN LI-ION BATTERIES

PRIORITY

This patent application claims the benefit under 35 U.S.C. § 119(e) of U.S. Patent Application Ser. No. 63/007,781, entitled "Lithium Fluoride-Containing Coatings for Cathode Active Materials in Li-Ion Batteries," filed on Apr. 9, 2020, which is incorporated herein by reference in its entirety.

U.S. GOVERNMENT LICENSE RIGHTS

This invention was made with U.S. government support under WFO Proposal No. 85F59. This invention was made under a CRADA 1500801 between Apple Inc. and Argonne National Laboratory operated for the United States Department of Energy. The U.S. government has certain rights in the invention.

FIELD

The disclosure is directed to coatings including mixtures of lithium fluoride and accompanying oxides for cathode active materials in Li-Ion batteries and improved electrochemical performance over the cathode active material with a single component coating.

BACKGROUND

As lithium ion battery-powered devices become increasingly small and more powerful, batteries powering these devices need to store more energy in a smaller volume. Consequently, use of battery-powered devices may be facilitated by mechanisms for improving the volumetric energy densities of batteries in the devices.

Lithium cobalt metal oxides or lithium transition metal oxides can be used in cathode active materials for lithium-ion batteries. The lithium transition metal oxides are derivations of lithium cobalt oxide. The lithium cobalt metal oxides or transition metal oxides can be in the form of powder.

In Li-ion batteries, the cathode materials of different compositions tend to react chemically or electrochemically with the liquid electrolyte that consists of a lithium salt ($LiPF_6$) in organic solvents (such as ethylene carbonate, ethyl-methylene carbonate), especially when Li is extracted from the cathodes during charging. This is one of the major reasons for causing short cycle life of the batteries. A coating can be applied to the cathode particles in order to mitigate the reaction between the cathode and electrolyte and to prevent dissolution of the transition metals from the cathode into the electrolyte.

Cathode active materials used in lithium ion batteries can include a coating such as aluminum oxide ($Al_2O_3$) or aluminum fluoride ($AlF_3$). However, there can be an energy density loss using non-conductive aluminum oxide, or process safety concerns from fluorides using aluminum fluoride coatings. Coatings can often cause energy density loss for the battery. There remains a need to develop coatings for improved battery performance.

BRIEF SUMMARY

In an embodiment, a plurality of particles are provided. Each particle may include a material comprising 0.95 to 1.30 mole fraction Li, at least 0.60 and less than 1.00 mole fraction Co, up to 10,000 ppm Al, 1.90 to 2.10 mole fraction O, and up to 0.30 mole fraction M, where M is at least one element selected from B, Na, Mg, P, Ti, Ca, V, Cr, Fe, Mn, Ni, Cu, Zn, Al, Sc, Y, Ga, Zr, Ru, Mo, La, Si, Nb, Ge, In, Sn, Sb, Te, and Ce. Each particle may also include a surface composition comprising a mixture of LiF and a metal fluoride, wherein an amount of fluorine (F) is greater than 0 and less than or equal to 5000 ppm, wherein the metal fluoride comprises a material selected from the group consisting of $AlF_3$, $CaF_2$, $MgF_2$, and $LaF_2$. The surface composition may also include a metal oxide comprising a material selected from the group consisting of $TiO_2$, MgO, $La_2O_3$, CaO, and $Al_2O_3$, wherein an amount of the metal oxide is greater than 0 and less than or equal to 20000 ppm.

In an embodiment, a plurality of particles are provided. Each particle may include a bulk material represented by formula:

$$Li_\alpha Co_{(1-x-2y)}Me_x(M1M2)_y O_z \qquad (III)$$

wherein Me is selected from a group consisting one or more of Li, Mg, Al, P, Ca, Ti, Zr, V, Cr, Mn, Fe, Ni, Cu, Zn, Ru, Sn, B, Na, Sc, Y, Ga, Mo, La, Si, Nb, Ge, In, Sn, Sb, Te, and Ce, wherein M1 is a metal having a +2 oxidation state selected from the group consisting of Ni, Mg, and Zn, wherein M2 is a metal having a +4 oxidation state selected from the group consisting of Mn, Ti, Zr, and V, wherein M1M2 represents pairs of M1 and M2, and wherein $0<x\le0.30$ per mole fraction, $0<y\le0.40$ per mole fraction, $0.95\le\alpha\le1.40$ per mole fraction, and $1.90\le z\le2.10$ per mole fraction. Each particle may also include a surface composition comprising a mixture of LiF and a metal fluoride, wherein an amount of fluorine (F) is greater than 0 and less than or equal to 5000 ppm, wherein the metal fluoride comprises a material selected from the group consisting of $AlF_3$, $CaF_2$, $MgF_2$, and $LaF_2$. The surface composition may also include a metal oxide comprising a material selected from the group consisting of MgO, $La_2O_3$, CaO, and $Al_2O_3$, and an accompanying oxide comprising one or more of $Al_2O_3$ and/or $TiO_2$. The surface composition may further include 0.001 to 0.2 atomic fraction Co.

In an embodiment, a method of forming the plurality of particles is provided. The method may include coating a coating mixture comprising a metal fluoride comprising a material selected from the group consisting of $MgF_2$, $LaF_3$, $CaF_2$, and $AlF_3$ and the accompanying oxide comprising one or more of $Al_2O_3$ and/or $TiO_2$ over a plurality of cores, each core comprising the lithium cobalt oxide-based bulk material. The method may also include heating the plurality of coated cores to an elevated temperature of at least 700° C. for a period of time, wherein the metal fluoride of the coating mixture reacts with the lithium cobalt oxide-based bulk material to form the surface composition comprising the lithium fluoride (LiF), the metal oxide, and the accompanying oxide.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

The disclosure provides a coating containing a lithium fluoride (LiF) for cathode particles in Li-ion batteries. The disclosure demonstrates improvement of the surface protection of the cathode particles for operation at high upper cut-off voltages (UCV) greater than 4.5 V in Li-ion batteries. The disclosure shows that a combination of oxides and fluorides along with elevated processing temperatures (e.g. greater than 700° C.) improves the surface protection of the cathode particles or particulates at high voltages (e.g. UCV greater than 4.5 V) and high temperatures (e.g. 45° C.).

The disclosure provides a method of forming the coating containing LiF. The method includes preparing an initial coating mixture containing metal fluorides and accompanying oxides, and coating the initial coating mixture over a cathode core material or cathode particles. The method also includes processing the coated cathode particles containing the initial coating mixture under sufficient heating conditions, such that the metal fluorides of the initial coating mixture can react with the accompanying oxides and the lithium from the cathode core materials to form a more stable form of fluoride. The coating comprising the LiF provides enhanced protection against $LiPF_6$ containing electrolyte at high temperature and upper cut-off voltages.

Battery Cells

Figure 1:
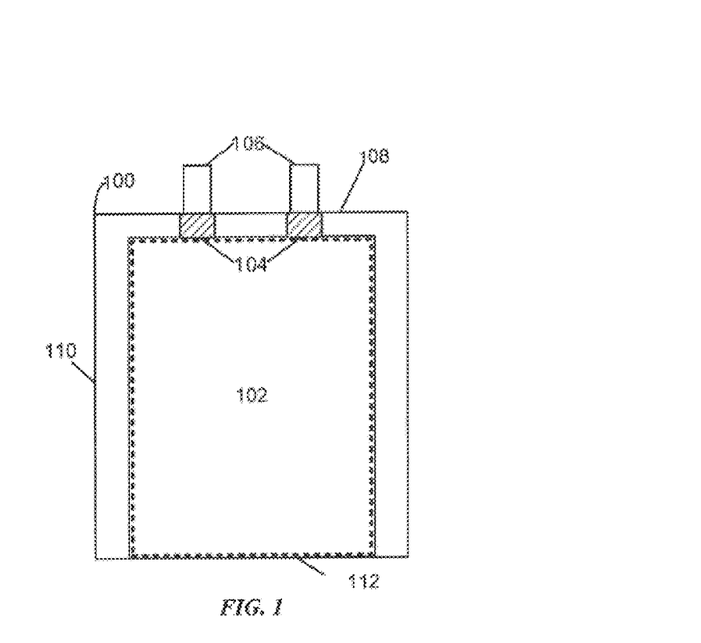
FIG. 1 presents a top-down view of a battery cell 100 in accordance with an embodiment.

FIG. 1 presents a top-down view of a battery cell 100 in accordance with an embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active material, a separator, and an anode with an anode active material. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., Celgard absorbed with $LiPF_6$ liquid electrolyte or a conducting polymer electrolyte) disposed between the one strip of cathode active material and the one strip of anode active material. The cathode, anode, and separator layers may be left flat in a planar configuration or may be wrapped into a wound configuration (e.g., a "jelly roll").

Enclosures can include, without limitations, pouches, such as flexible pouches, rigid containers, and the like. Returning to FIG. 1, during assembly of the battery cell 100, the stack 102 is enclosed in an enclosure. The stack 102 may be in a planar or wound configuration, although other configurations are possible. Flexible pouch can be formed by folding a flexible sheet along a fold line 112. For example, the flexible sheet may be made of aluminum with a polymer film, such as polypropylene. After the flexible sheet is folded, the flexible sheet can be sealed, for example, by applying heat along a side seal 110 and along a terrace seal 108. The flexible pouch may be less than 120 microns thick to improve the packaging efficiency of the battery cell 100, the density of battery cell 100, or both.

The stack 102 can also include a set of conductive tabs 106 coupled to the cathode and the anode. The conductive tabs 106 may extend through seals in the enclosure (for example, formed using sealing tape 104) to provide terminals for the battery cell 100. The conductive tabs 106 may then be used to electrically couple the battery cell 100 with one or more other battery cells to form a battery pack.

Batteries can be combined in a battery pack in any configuration. For example, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2A:
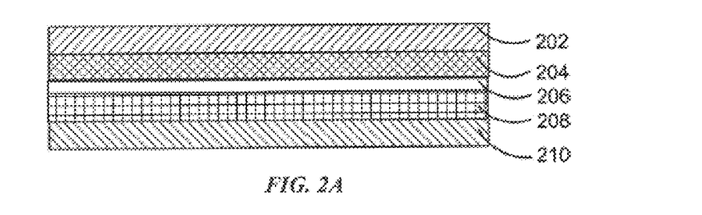
FIG. 2A presents a side view of a set of layers for a battery cell (e.g., the battery cell 100 of FIG. 1) in accordance with the disclosed embodiments.

FIG. 2A presents a side view of a set of layers for a battery cell (e.g., the battery cell 100 of FIG. 1) in accordance with the disclosed embodiments. The set of layers may include a cathode current collector 202, a cathode active material 204, a separator 206, an anode active material 208, and an anode current collector 210. The cathode current collector 202 and the cathode active material 204 may form a cathode for the battery cell, and the anode current collector 210 and the anode active material 208 may form an anode for the battery cell. To create the battery cell, the set of layers may be stacked in a planar configuration, or stacked and then wrapped into a wound configuration.

As mentioned above, the cathode current collector 202 may be aluminum foil, the cathode active material 204 may be a lithium compound, the anode current collector 210 may be copper foil, the anode active material 208 may be carbon, and the separator 206 may include Celgard absorbed with $LiPF_6$ containing electrolyte or a conducting polymer electrolyte.

It will be understood that the cathode active materials described herein can be used in conjunction with any battery cells or components thereof known in the art. For example, in addition to wound battery cells, the layers may be stacked and/or used to form other types of battery cell structures, such as bi-cell structures. All such battery cell structures are known in the art.

Figure 2B:
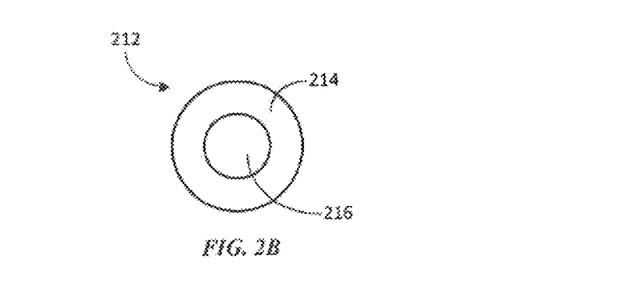
FIG. 2B is a sectional view of a coated particle including a cathode active particle and a coating in accordance with an illustrative embodiment.

In further variations, a cathode active material comprises a cathode active compound particle containing lithium cobalt oxide and a coating. FIG. 2B is a sectional view of a coated particle including a cathode active particle and a coating in accordance with an illustrative embodiment. As shown, a coated cathode active compound particle 212 can include a cathode active compound particle or a cathode active compound particle 216 and a coating 214.

The coating 214 can be a mixture of metal fluoride, a metal oxide, and one or more accompanying oxides. In some variations, the coating may be a layer of material in contact with a surface of the cathode active compound particle or a reaction layer formed along the surface of the cathode active compound particle. In some variations, the metal fluoride may include one or more materials selected from the group consisting of LiF, $AlF_3$, $CaF_2$, $MgF_2$, $CoF_2$, and $LaF_2$. In some variations, the metal oxide may include one or more material selected from the group consisting of MgO, $La_2O_3$, CaO, and $Al_2O_3$. In some variations, the accompanying oxide(s) may include one or more of $Al_2O_3$, $TiO_2$, among others.

In various embodiments, the performance of batteries including the cathode active material can increase battery capacity and/or reduce the loss of available power in a fully charged battery over time.

The coating can be in any amount known in the art. The coating may also be a continuous coating or a discontinuous coating. Non-limiting examples of discontinuous coatings include coatings with voids or cracks and coatings formed of particles with gaps there between. Other types of discontinuous coatings are possible.

A powder comprising the particles described herein can be used as a cathode active material in a lithium ion battery. Such cathode active materials can tolerate voltages equal to or higher than conventional materials (i.e., relative to a $Li/Li^+$ redox couple) without severe capacity fade. Capacity fade degrades battery performance and may result from a structural instability of the cathode active material, a side reaction with electrolyte at high voltage, surface instability, dissolution of cathode active material into the electrolyte, or some combination thereof.

In various aspects, the cathode active materials described herein can result in lithium ion batteries that can be charged at high voltages without severe capacity fade. Without wishing to be held to a specific mechanisms or mode of action, the compounds may impede or retard structural deviations from an $\alpha$-$NaFeO_2$ crystal structure during charging to/at higher voltages.

Batteries having cathode active materials that include the disclosed coatings can show improved battery performance. For example, the cathode active materials include the coated particles containing a mixture of fluoride and oxides provide for an increased battery capacity and an increase average voltage and also an increased discharge energy over cycles.

Coating

Applicants discovered the presence of fluoride in the coating when a tri-component coating mixture containing intimately mixed nano-particulates of $Al_2O_3$, $MgF_2$, and $TiO_2$ were processed at an elevated temperature (e.g. 900° C.) for an extended period of time (e.g. 18 hours). Analysis of the particulates using $^{19}F$ Nuclear Magnetic Resonance (NMR) yielded a surprising result of detection of $CaF_2$ and LiF peaks in the NMR spectra, with no $MgF_2$ remaining.

In some variations, the processing temperature may vary from 700° C. to 1000° C. In some variations, the processing temperature is equal to or greater than 700° C. In some variations, the processing temperature is equal to or greater than 750° C. In some variations, the processing temperature is equal to or greater than 800° C. In some variations, the processing temperature is equal to or greater than 850° C. In some variations, the processing temperature is equal to or greater than 900° C.

In some variations, the processing temperature is equal to or less than 750° C. In some variations, the processing temperature is equal to or less than 800° C. In some variations, the processing temperature is equal to or less than 850° C. In some variations, the processing temperature is equal to or less than 900° C. In some variations, the processing temperature is equal to or less than 1000° C.

Figure 3A:
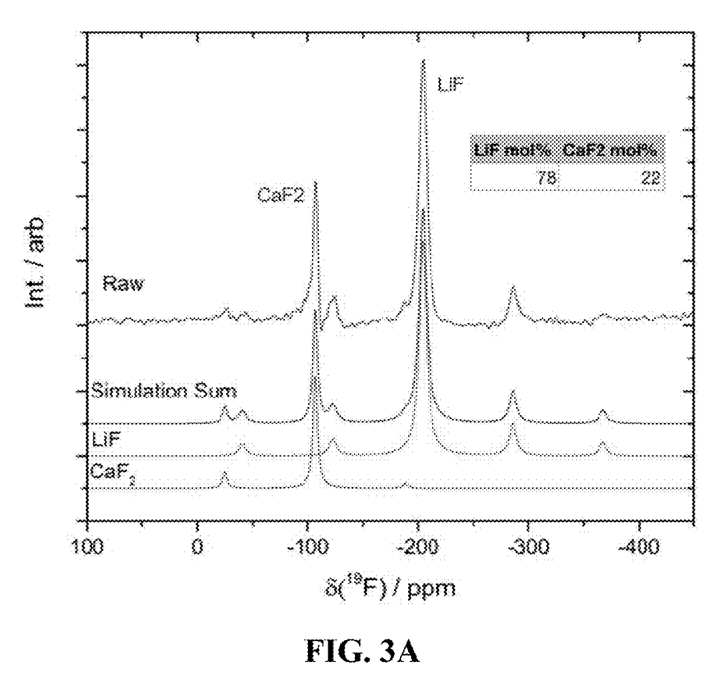
FIG. 3A depicts a 19F NMR spectrum of $MgF_2$ coated cathode particles heat treated at 900° C. for 18 hours in accordance with an embodiment of the disclosure.

FIG. 3A illustrates 19F NMR spectrum of $MgF_2$ coated cathode particles heat treated at 900° C. for 18 hours in accordance with an embodiment of the disclosure. As shown in FIG. 3A, $MgF_2$ peak was not present, while LiF peak was present. $CaF_2$ peak was also present in FIG. 3A. The $CaF_2$ formation was due to an unintentional reaction of Ca impurity with $MgF_2$.

Further investigations through thermodynamic calculations showed that the stability order of the metal fluorides of interest was: LiF>$CaF_2$>$MgF_2$>$LaF_3$>$AlF_3$. Equilibrium calculations of the aforementioned metals mixed with $Li_2O$ showed that the LiF would preferentially form, leaving the metal oxides including CaO, MgO, $La_2O_3$, and $Al_2O_3$ as most stable products, as shown in FIGS. 3B and 3C.

Figure 3B:
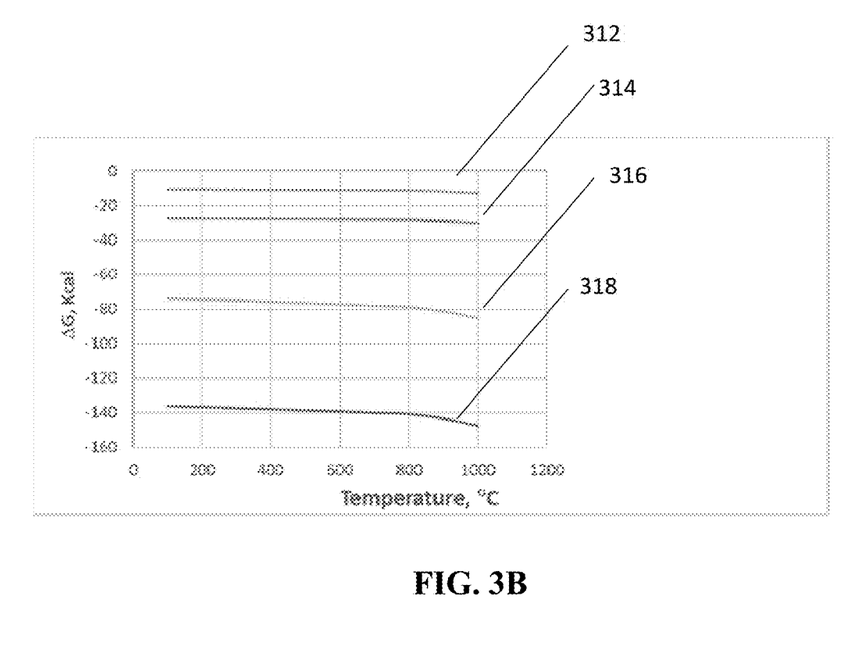
FIG. 3B illustrates free energy ($\Delta G$) vs temperature of the reactions demonstrating the degree of reactivity of metal fluoride with $Li_2O$ in accordance with an embodiment of the disclosure.
Figure 3C:
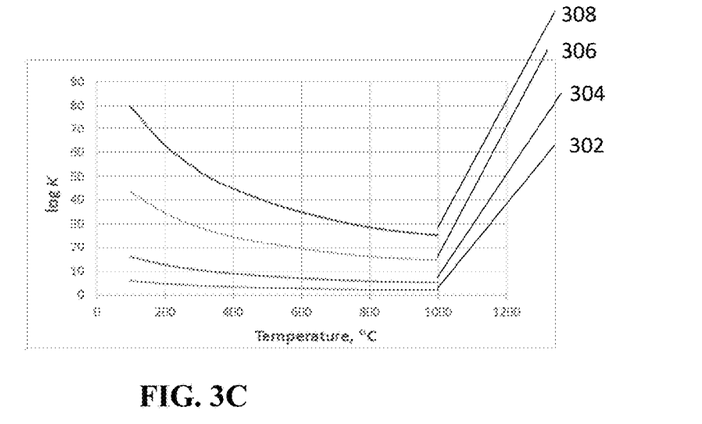
FIG. 3C illustrates the equilibrium constant (K) of the reactions demonstrating the reactivity of the metal fluoride with respect to $Li_2O$ in accordance with an embodiment of the disclosure.

FIG. 3B illustrates free energy ($\Delta G$) vs temperature of the reactions demonstrating the degree of reactivity of metal fluoride with $Li_2O$ in accordance with an embodiment of the disclosure. Curves 312, 314, 316, and 318 represent free energy (ΔG) of the reactions for four metal fluorides $MF_x$ with $Li_2O$, reactively. The four reactions are:

$$CaF_2+Li_2O=2LiF+CaO, \quad (1)$$

$$MgF_2+Li_2O=2LiF+MgO, \quad (2)$$

$$2LaF_3+3Li_2O=6LiF+La_2O_3, \text{ and} \quad (3)$$

$$2AlF_3+3Li_2O=6LiF+Al_2O_3. \quad (4)$$

As the free energy change of the reaction decreased below zero to larger negative values the reaction would more likely take place spontaneously. As shown in reaction (4), $AlF_3$ can react with $Li_2O$ to form LiF and $Al_2O_3$. Also, $CaF_2$ had a lower free energy change and a less capacity than $AlF_3$ to react with $Li_2O$ to form LiF and CaO, as shown in reaction (1).

FIG. 3C illustrates the equilibrium constant (K) of the reactions demonstrating the reactivity of the metal fluoride with respect to $Li_2O$ in accordance with an embodiment of the disclosure. Curves 302, 304, 306, and 308 represent the equilibrium constant K in log scale of the reactions for four metal fluorides $MF_x$ with $Li_2O$, respectively. The four metal fluorides are formed by the following reactions:

$$CaF_2+Li_2O=2LiF+CaO,$$

$$MgF_2+Li_2O=2LiF+MgO,$$

$$2LaF_3+3Li_2O=6LiF+La_2O_3, \text{ and}$$

$$2AlF_3+3Li_2O=6LiF+Al_2O_3.$$

The large K values suggested that the amount of product on the right side of the reaction equation as shown in FIG. 3C was larger for $AlF_3$ than $CaF_2$.

Figure 3D:
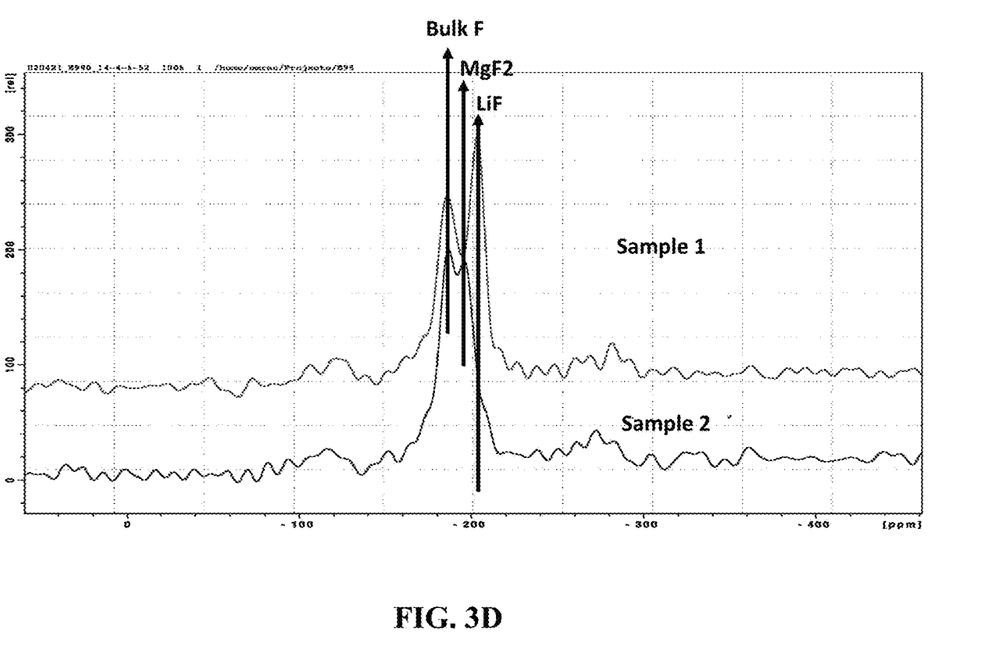
FIG. 3D illustrates 19F NMR spectrum of two samples of $Li_xCoAlMnNiMgTiO_2$ containing 500-6000 ppm Al, Mn, Ni, Mg, and Ti, with a particle size D50=5 microns. Both samples are coated with 300-800 ppm $Al_2O_3$, $TiO_2$ and $MgF_2$ but sample 1 is produced by heating to 960° C. for 10 hours as while sample 2 is produced with additional annealing for 2 hours.

FIG. 3D illustrates 19F NMR spectrum of two samples of $Li_xCoAlMnNiMgTiO_2$ containing 500-6000 ppm Al, Mn, Ni, Mg, and Ti, with a particle size D50=5 microns. Both samples are coated with 300-800 ppm $Al_2O_3$, $TiO_2$ and $MgF_2$ but sample 1 is done by heating to 960° C. for 10 hours as while sample 2 is done with additional annealing for 2 hours. The relative amounts of LiF, $MgF_2$, and bulk F are depicted for each sample. As illustrated in FIG. 3D, the amount of LiF is substantially reduced in the 19F NMR spectrum upon an additional annealing for 2 hours. The relative amounts of $MgF_2$ and bulk F are increased after additional annealing for 2 hours.

These calculations provided the basis of the disclosure. According to the calculations, a better coating can be achieved when a less-stable metal fluoride used as a coating precursor is mixed with other preferable oxides, and then heated to a sufficiently high temperature to react with lithium (Li) from the core material or particle and to form the coating including a mixture of metal oxide, metal fluoride and LiF from the reaction.

Several coated samples were made using different cathode cores on the metal fluoride $MF_x$. Coin cells were made with these coated samples. These coin cells were tested electrochemically. When heat treated at temperature greater than 700° C., it was believed that the metal fluoride component of each coating would react with the lithium in the cathode core to form a metal oxide, metal fluoride and LiF. The range of fluorine (F) content affected the amount of metal fluoride coated on the surface. The weight fraction of F in parts per million by weight in the examples varied between 100 ppm and 1600 ppm. It will be appreciated by those skilled in the art that the amount of fluorine may be up to 5000 ppm.

In some variations, the amount of fluorine may be equal to or less than 5000 ppm. In some variations, the amount of fluorine may be equal to or less than 4500 ppm. In some variations, the amount of fluorine may be equal to or less than 4000 ppm. In some variations, the amount of fluorine may be equal to or less than 3500 ppm. In some variations, the amount of fluorine may be equal to or less than 3000 ppm. In some variations, the amount of fluorine may be equal to or less than 2500 ppm. In some variations, the amount of fluorine may be equal to or less than 2000 ppm. In some variations, the amount of fluorine may be equal to or less than 1500 ppm. In some variations, the amount of fluorine may be equal to or less than 1000 ppm. In some variations, the amount of fluorine may be equal to or less than 500 ppm. In some variations, the amount of fluorine may be equal to or less than 400 ppm. In some variations, the amount of fluorine may be equal to or less than 300 ppm. In some variations, the amount of fluorine may be equal to or less than 200 ppm. In some variations, the amount of fluorine may be equal to or less than 100 ppm.

In some variations, the amount of fluorine may be equal to or greater than 4500 ppm. In some variations, the amount of fluorine may be equal to or greater than 4000 ppm. In some variations, the amount of fluorine may be equal to or greater than 3500 ppm. In some variations, the amount of fluorine may be equal to or greater than 3000 ppm. In some variations, the amount of fluorine may be equal to or greater than 2500 ppm. In some variations, the amount of fluorine may be equal to or greater than 2000 ppm. In some variations, the amount of fluorine may be equal to or greater than 1500 ppm. In some variations, the amount of fluorine may be equal to or greater than 1000 ppm. In some variations, the amount of fluorine may be equal to or greater than 500 ppm. In some variations, the amount of fluorine may be equal to or greater than 400 ppm. In some variations, the amount of fluorine may be equal to or greater than 300 ppm. In some variations, the amount of fluorine may be equal to or greater than 200 ppm. In some variations, the amount of fluorine may be equal to or greater than 100 ppm. High amount of fluorine in the coating layer may create a layer that may stop the transfer of Li into and out of the material.

In various aspects, the amount of coating can be chosen such that a capacity of the cathode active material is not negatively impacted. In some variations, the oxide components of the coating may be up to 2 weight percent of the particle weight. High amounts of coating can result in better protection yet with a consequential reduction in the activity of Li transfer through the coating.

Cathode Active Materials

Lithium cobalt oxides can be used in cathode active materials for commercial lithium-ion batteries. These compounds often include lithium cobalt oxide or derivatives thereof. The performance of such cathode active materials can be increased by improving its capacity, working voltage, and gravimetric electrode density.

In some variations, the cathode compound or materials may have the following formula (I) and contains Mn:

$$Li_aCo_{1-x-y}M_yMn_xO_d \quad (I)$$

wherein M is at least one element selected from B, Na, Mg, P, Ti, Ca, V, Cr, Fe, Ni, Cu, Zn, Al, Sc, Y, Ga, Zr, Ru, Mo, La, Si, Nb, Ge, In, Sn, Sb, Te, and Ce.

wherein $0.95 \le a \le 1.30$, $0 < x \le 0.30$, $0 < y \le 0.10$, and $1.98 \le d \le 2.04$.

In some variations, the cathode compound or materials may also be represented by Formula (I):

$$Li_aCo_{1-x-y-z}Mn_xAl_yNi_zO_\delta \quad (II)$$

wherein 0.95≤α≤1.30 per mole fraction basis, 0<x≤0.07, 0 ppm<y≤10,000 ppm by weight, 0≤z≤0.07 per mole fraction basis, and 1.98≤δ≤2.04.

In some variations, the cathode compound or materials may also have the following formula (II), including pairing compositions and is not limited to Mn:

$$Li_\alpha Co_{(1-x-2y)} Me_x (M1M2)_y O_z \qquad (III)$$

wherein Me is selected from the group consisting one or more of Li, Mg, Al, P, Ca, Ti, Zr, V, Cr, Mn, Fe, Ni, Cu, Zn, Ru, Sn, B, Na, Sc, Y, Ga, Mo, La, Si, Nb, Ge, In, Sn, Sb, Te, and Ce.

wherein M1 is a metal having a +2 oxidation state selected from the group consisting of Ni, Mg, and Zn;

wherein M2 is a metal having a +4 oxidation state selected from the group consisting of Mn, Ti, Zr, and V;

wherein M1M2 represents pairs of M1 and M2; and wherein 0<x≤0.30, 0<y≤0.40, 0.95≤α≤1.40, and 1.90≤z≤2.10.

In some variations, the material comprises $Li_{0.992}Co_{0.97}Mn_{0.02}Al_{0.01}O_2$.

In some variations, the material comprises $Li_{0.99}Co_{0.95}Mn_{0.02}Ni_{0.02}O_2$.

EXAMPLES

The present technology is further illustrated by the following Examples, which should not be construed as limiting.

Example 1—Double Component Coating Mixture of $Al_2O_3$ and $MgF_2$

Preparation of Coatings

An uncoated powder cathode material having the composition: $Li_\alpha Co_{1-x-y-z} Mn_x Al_y Ni_z O_\delta$, wherein α=0.992, x=0.02, y=0.01 (3,000 ppm by weight), z=0, and δ is 2.00, $Li_{0.992}Co_{0.97}Mn_{0.02}Al_{0.01}O_2$, was produced using a standard material synthesis and processing procedure, including co-precipitation from metal salt solutions to form well defined hydroxide precursor particles, blending these particles with the desired amount of lithium carbonate, and calcining at an elevated temperature (e.g. 1070° C.) for a period of time (e.g. 8 h) in air. The coating of cathode particles was prepared by blending the $Li_{0.992}Co_{0.97}Mn_{0.02}Al_{0.01}O_2$ particles with fine nanometer sized particles of either $Al_2O_3$, $MgF_2$ and combinations of each, and stearic acid, which used as a solid binder and dispersant.

For example, a double component coating mixture of $Al_2O_3$ (2000 ppm Al) and $MgF_2$ (500 ppm Mg) was made by mixing the $Al_2O_3$ and $MgF_2$ nano-size powders together in a high energy ball mill with 12% by weight stearic acid for four hours. Then, the double component coating mixture was subsequently blended with cathode active material $Li_{0.992}Co_{0.97}Mn_{0.02}Al_{0.01}O_2$ powder. The coated cathode material was then heated to an elevated temperature (e.g. 800° C.) in air for a period of time, e.g. 8 hours (8 h).

Forming Cathode Test Electrodes

The finished cathode powder is blended with an electrically conductive powder (carbon), organic binder, and solvent to form a pourable slurry. The slurry is cast on aluminum foil and dried, forming a laminate.

The laminate is subsequently roll-calendared to compact the particulate layer to a high specific density. During calendaring, the particles flow into voids and pack together. The particles can have sufficient strength to prevent being crushed, which would create new active unprotected surfaces that will interact with the electrolyte during cell operation. The finished laminate is assembled together with a separator and anode layers and saturated with an electrolyte solution to form a Li-ion cell.

In some variations, the cathode disks can be formed from the coated powder. A mill may be used to grind powder into finer powder. The density of the cathode disk may increase by introducing a bimodal particle size distribution of the powder.

The porosity of the cathode may affect the performance of an electrochemical cell. A hydraulic press may be used to compact powder to obtain a cathode disk of desired thickness and density during cold pressing. For example, the coated cathode active material was placed in a die that can be compressed up to 5000 lbs. The press includes two plates that are hydraulically forced together to create a pressure.

Testing Methods

The cathode disks were assembled into button cell (coin cell) batteries with a Li disk anode, a Celgard 2325 separator (25 μm thick), and the electrolyte consisting of 1.2 M LiPF6 in ethyl carbonate (EC) and ethyl methyl carbonate (EMC) (EC:EMC=3:7 w/w). Galvanostatic charge/discharge cycling was conducted in the 3.0-4.6 V range at a C/5 rate and 25° C. The batteries are aged for 30 to 80 cycles.

An electrochemical tester (e.g. Maccor 4200) provides a user with a variety of options in testing of batteries. Multiple channels can be plugged into the electrochemical tester to allow for multiple batteries to be tested simultaneously. These tests allow the user to measure parameters of the batteries, such as voltage, current, impedance, and capacity, to fully understand the effectiveness of the electrochemical cell being tested. The tester can be attached to a computer to obtain digital testing values.

Results

The coated cathode material or particles were used for a cathode in a lithium-ion coin cell, which demonstrated much better electrochemical performance than the $Al_2O_3$-coated cathode material, which was used as a baseline. Without wishing to be held to any particular mechanism or mode of action, it was believed that $MgF_2$ reacted with Li from the cathode material $Li_{0.992}Co_{0.97}Mn_{0.02}Al_{0.01}O_2$ to form a coating including a mixture of MgO, LiF, and $Al_2O_3$.

Table 1 lists a comparison of the surface compositions versus bulk compositions in units of mole fraction with respect to the total elements in the transition metal layer. The surface compositions were determined using X-ray Photoelectron Spectroscopy (XPS). Normally, the surface composition was the composition within about 10 nm from the surface. The bulk compositions were determined using Inductively Coupled Plasma-Optical Emission Spectroscopy (ICP-OES) for the coated cathode material $Li_{0.992}Co_{0.97}Mn_{0.02}Al_{0.01}O_2$ with 500 ppm Mg (as $MgF_2$) and 2000 ppm Al (as $Al_2O_3$).

TABLE 1

Atomic fraction of elements measured on the surface (XPS) and in the bulk (ICP-OES) of $Al_2O_3$ (2000 ppm Al) and $MgF_2$ (500 ppm Mg) coated $Li_{0.992}Co_{0.97}Mn_{0.02}Al_{0.01}O_2$.

|  | Al | Co | Li | Mg | Mn | Ni | Ti | F |
|---|---|---|---|---|---|---|---|---|
| Surface fraction by XPS | 0.035 | 0.095 | 0.070 | 0.019 | 0.018 | 0 | 0 | 0.077 |
| Bulk fraction by ICP-OES | 0.017 | 0.982 | 0.981 | 0.002 | 0.020 | 0 | 0 | n/a |

The surface composition was rich in Al, Mg, and F. Specifically, the XPS values of Mg (0.019) and Al (0.035) at the surface were more than the ICP-OES values of Mg (0.002) and Al (0.017) in the bulk, respectively. The result suggested that Mg and Al elements stayed near the surface as a coating during the heating process at the elevated temperature for a period of time, e.g. 800° C. for 8 hours. The surface composition also included an atomic fraction of 0.095 Co while the bulk composition included an atomic fraction of 0.98 Co, which indicated the coating had about 90% coverage. The Mn ions were about the same throughout the surface and the bulk of the coated cathode material (e.g. 0.018 at the surface and 0.020 in the bulk), which suggested that Mn was diffused to the surface from the bulk.

If fluorine (F) content on the surface of 0.077 was equal to the twice of the amount of Mg of 0.019, which would indicate that the $MgF_2$ compound remained unchanged. However, the fluorine (F) content on the surface of 0.077 was unexpectedly greater than the twice of the amount of Mg of 0.019. Also, the Li (0.070) was similar to the F (0.077), which suggested the presence of LiF, which was the most stable phase at high temperature, e.g. 800° C.

In some variations, the coating can include other oxides than $Al_2O_3$, such as $TiO_2$, $La_2O_3$, MgO, $ZrO_2$, among others.

Table 2 shows a list of the cathode core compounds with compositions and coating materials for the cathode active materials, and processing conditions for all coin cell samples evaluated. As shown in Table 2, two cathode core compounds $Li_{0.992}Co_{0.97}Mn_{0.02}Al_{0.01}O_2$ and $Li_{0.99}Co_{0.95}Mn_{0.03}Ni_{0.02}O_2$ were evaluated. The initial coatings included a double component coating mixture of $Al_2O_3$ and $MgF_2$, a tri-component coating mixture of $MgF_2$, $TiO_2$, and $Al_2O_3$, a single component of $MgF_2$, or $Al_2O_3$. As shown in Table 2, the amount of initial coatings were also listed. For example, the initial coating $MgF_2$ had 500 ppm Mg for Sample C2143. The initial coating $Al_2O_3$ had 3000 ppm Al for Sample C2023, and 2000 ppm Al for Sample C2144. Various processing conditions included processing at 700° C., 750° C., 800° C., and 900° C. for a period of time, e.g. 8 hours (8 h).

binder/dispersant solid state coating process outlined in Example 1. The processing conditions were selected for each coating type and listed in Table 3. Although the initial mixture of the coatings started out with $MgF_2$, it was believed, as shown in Example 1, that the high temperature processing at 800° C. for 8 h converted the $MgF_2$ to MgO and LiF by reacting with the cathode material $Li_{0.992}Co_{0.97}Mn_{0.02}Al_{0.01}O_2$.

To make a high density electrode for electrochemical testing, the coated "core" powder was mixed with 15 volume % of small (1-5 μm size) commercially produced "filler" particles to form a bimodal mixture or bimodal powder of filler and core particles. The filler particles had been previously coated with nano-$Al_2O_3$ particles using the same process described herein. The same filler powder was mixed with each different coated core sample for testing. The bimodal particle size mixture was then formed into laminates.

In some embodiments, fillers may be added to the cathode active material to increase packing density.

TABLE 3

Processing conditions for coatings on $Li_{0.992}Co_{0.97}Mn_{0.02}Al_{0.01}O_2$.

| Coating type | Process conditions | |
|---|---|---|
| 500 ppm Mg($F_2$) | 800° C. | 8 h |
| 2000 ppm Al($_2O_3$) | 900° C. | 8 h |
| 500 ppm Mg($F_2$) + 2000 ppm Al($_2O_3$) | 800° C. | 8 h |

Coin cells were made from the finished cathode powder by blending with an electrically conductive powder (carbon), organic binder, and solvent to form a pourable slurry. The slurry was cast on aluminum foil and dried, forming a laminate. The laminate was subsequently roll-calendared to compact the particulate layer to a high specific density. During calendaring, the particles flow into voids and pack

TABLE 2

Initial coating mixtures and core compositions that were evaluated by electrochemical testing

| ID | Coating type | Core composition | Process conditions | |
|---|---|---|---|---|
| C2023 | 3000 ppm Al($_2O_3$) | $Li_{0.99}Co_{0.95}Mn_{0.03}Ni_{0.02}O_2$ | 900° C. | 8 h |
| C2084 | 500 ppm Mg($F_2$) + 2000 ppm Al($_2O_3$) | $Li_{0.992}Co_{0.97}Mn_{0.02}Al_{0.01}O_2$ | 800° C. | 8 h |
| C2111 | 500 ppm Mg($F_2$) + 2000 ppm Al($_2O_3$) | $Li_{0.992}Co_{0.97}Mn_{0.02}Al_{0.01}O_2$ | 700° C. | 8 h |
| C2112 | 2000 ppm Al($_2O_3$) + 500 ppm Mg($F_2$) | $Li_{0.992}Co_{0.97}Mn_{0.02}Al_{0.01}O_2$ | 800° C. | 8 h |
| C2113 | 500 ppm Mg(F2) + 2000 ppm Al(2O3) | $Li_{0.992}Co_{0.97}Mn_{0.02}Al_{0.01}O_2$ | 900° C. | 8 h |
| C2115 | 2000 ppm Al($_2O_3$) | $Li_{0.992}Co_{0.97}Mn_{0.02}Al_{0.01}O_2$ | 900° C. | 8 h |
| C2143 | 500 ppm Mg(F2) | $Li_{0.992}Co_{0.97}Mn_{0.02}Al_{0.01}O_2$ | 800° C. | 8 h |
| C2144 | 2000 ppm Al(2O3) | $Li_{0.992}Co_{0.97}Mn_{0.02}Al_{0.01}O_2$ | 900° C. | 8 h |
| C2151 | 500 ppm Mg($F_2$) + 1000 ppm Ti($O_2$) + 2000 ppm Al($_2O_3$) | $Li_{0.992}Co_{0.97}Mn_{0.02}Al_{0.01}O_2$ | 800° C. | 8 h |
| C2151 | 2000 ppm Al(2O3) + 500 ppm Mg(F2) + 1000 ppm Ti(O2) | $Li_{0.992}Co_{0.97}Mn_{0.02}Al_{0.01}O_2$ | 900° C. | 8 h |
| C2163 | 500 ppm Mg($F_2$) + 2000 ppm Al($_2O_3$) | $Li_{0.992}Co_{0.97}Mn_{0.02}Al_{0.01}O_2$ | 800° C. | 8 h |
| C2164 | 1000 ppm Mg($F_2$) + 2000 ppm Al($_2O_3$) | $Li_{0.992}Co_{0.97}Mn_{0.02}Al_{0.01}O_2$ | 800° C. | 8 h |
| C2165 | 1000 ppm Mg($F_2$) + 2000 ppm Al($_2O_3$) | $Li_{0.992}Co_{0.97}Mn_{0.02}Al_{0.01}O_2$ | 900° C. | 8 h |
| C2166 | 500 ppm Al($F_3$) + 2000 ppm Al($_2O_3$) | $Li_{0.992}Co_{0.97}Mn_{0.02}Al_{0.01}O_2$ | 800° C. | 8 h |
| C2173 | 500 ppm Mg($F_2$) + 1000 ppm Ti($O_2$) + 3500 ppm Al($_2O_3$) | $Li_{0.99}Co_{0.95}Mn_{0.03}Ni_{0.02}O_2$ | 900° C. | 8 h |
| C2174 | 500 ppm Mg($F_2$) + 1000 ppm Ti($O_2$) + 3500 ppm Al($_2O_3$) | $Li_{0.99}Co_{0.95}Mn_{0.03}Ni_{0.02}O_2$ | 800° C. | 8 h |
| C2175 | 500 ppm Mg($F_2$) + 1000 ppm Ti($O_2$) + 3500 ppm Al($_2O_3$) | $Li_{0.99}Co_{0.95}Mn_{0.03}Ni_{0.02}O_2$ | 750° C. | 8 h |

Example 2—Coin Cell of $Li_{0.992}Co_{0.97}Mn_{0.02}Al_{0.01}O_2$ Coated with a Double Component Coating Mixture of $MgF_2$ and $Al_2O_3$ The core material described in Example 1, $Li_{0.992}Co_{0.97}Mn_{0.02}Al_{0.1}O_2$, was coated in three separate batches 1) 500 ppm Mg($F_2$), 2) 2000 ppm Al($_2O_3$) and 3) 500 ppm Mg($F_2$)+2000 ppm Al($_2O_3$) with the stearic acid together. The finished laminate is assembled together with a separator, a Li disk anode (½ coin cell), and saturated with an electrolyte solution to form a Li-ion coin cell. These coin cells were cycled between 3.0 V and 4.6 V at a C/5 rate at a temperature of 25° C.

Figure 4:
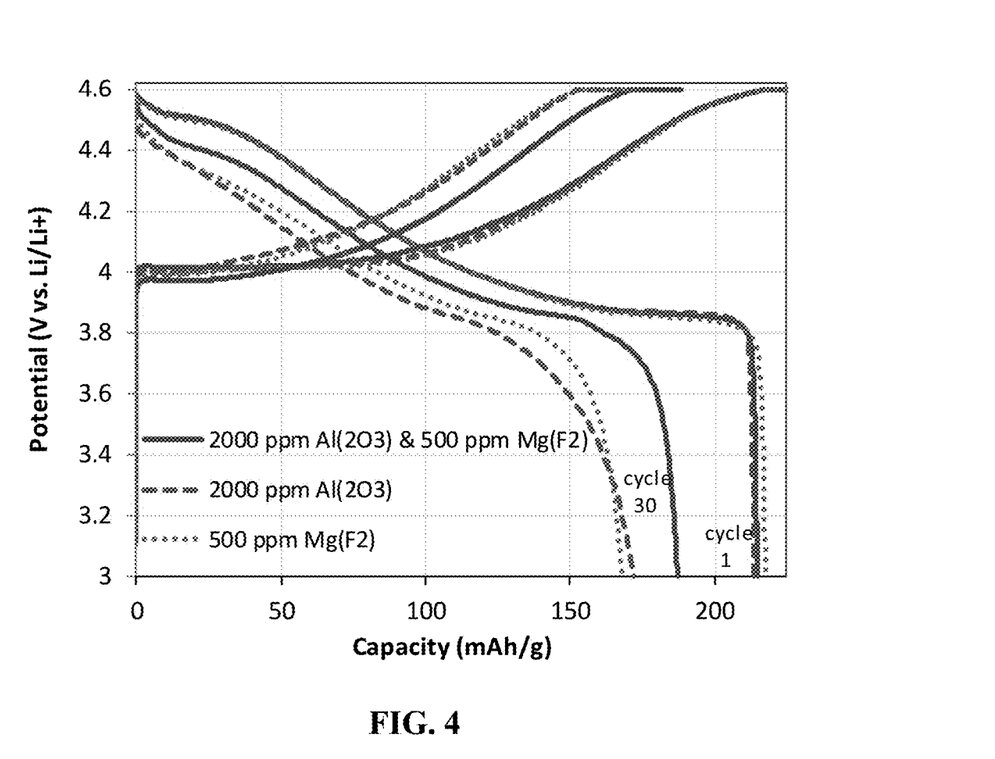
FIG. 4 illustrates voltage profile comparison of $MgF_2$ and $Al_2O_3$ coatings on $Li_{0.992}Co_{0.97}Mn_{0.02}Al_{0.01}O_2$ bimodal powder electrodes for Samples C2143, C2144, and C2084 in accordance with an embodiment of the disclosure.

FIG. 4 illustrates voltage profile comparison of $MgF_2$ and $Al_2O_3$ coatings on $Li_{0.992}Co_{0.97}Mn_{0.02}Al_{0.01}O_2$ bimodal powder electrodes for Samples C2143, C2144, and C2084, as listed in Table 2. The voltage profile, i.e. potential versus capacity, of the coin cells made from the three coatings in Table 3 after first cycle and 30th cycles are shown in FIG. 4. Curves 402A (solid line), 402B (dashed line), and 402C (dotted line) represent potential versus capacity after 1 cycle for the double component coating mixture of $MgF_2$ and $Al_2O_3$ containing 500 ppm $Mg(F_2)$ and 2000 ppm $Al(_2O_3)$, the single component $Al_2O_3$ coating containing 2000 ppm $Al(_2O_3)$, and the single component $Al_2O_3$ coating containing 500 ppm $Mg(F_2)$, respectively. The curves represent potential versus capacity after 30 cycles for the double component coating mixture of $MgF_2$ and $Al_2O_3$, the single component $Al_2O_3$ coating, and the single component $Al_2O_3$ coating, respectively.

The coatings showed an initial capacity of 214-217 mAh/g in the first cycle with all three coatings, demonstrating a similar charge and discharge voltage profile. After 30 cycles of 4.6V charge/discharge, the coin cells had reduced capacity and average voltage. The coating containing the mixture of $Al_2O_3$ and $MgF_2$ as starting components shows the best electrochemical performance in capacity and voltage among the three coatings. Samples with individual coatings of $Al_2O_3$ or $MgF_2$ showed significant reductions in capacity and voltage after 30 cycles.

Figure 5:
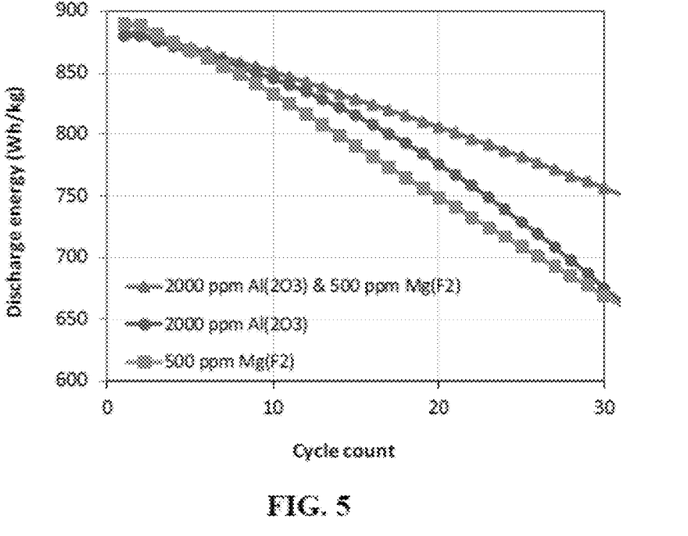
FIG. 5 illustrates comparison of discharge energy versus cycles of $MgF_2$ and $Al_2O_3$ coatings on $Li_{0.992}Co_{0.97}Mn_{0.02}Al_{0.01}O_2$ bimodal powder electrodes for Samples C2143, C2144, and C2084 in accordance with an embodiment of the disclosure.

FIG. 5 illustrates coin cell cycling comparison of $MgF_2$ and $Al_2O_3$ coatings on $Li_{0.992}Co_{0.97}Mn_{0.02}Al_{0.01}O_2$ bimodal powder electrodes for Samples C2143, C2144, and C2084, as listed in Table 2. The curves represent discharge energy versus cycle count for the double component coating mixture of $Al_2O_3$ and $MgF_2$ containing 2000 ppm $Al(_2O_3)$ and 500 ppm $Mg(F_2)$, the single component $Al_2O_3$ coating containing 2000 ppm Al, and the single component $MgF_2$ coating containing 500 ppm $Mg(F_2)$, respectively. A plot of the discharge energy versus cycle count illustrates that the discharge energy of the coin cell for the double component coating mixture of $Al_2O_3$ and $MgF_2$ as starting components shows better cycle performance than the single component coatings of both $Al_2O_3$ and $MgF_2$.

Example 3—Coin Cell of $Li_{0.992}Co_{0.97}Mn_{0.02}Al_{0.01}O_2$ Coated with a Tri-Component Coating Mixture of $MgF_2$, $TiO_2$, and $Al_2O_3$ The core material described in Example 1, cathode material $Li_{0.992}Co_{0.97}Mn_{0.02}Al_{0.01}O_2$, was coated in three separate batches 1) 2000 ppm $Al(_2O_3)$, 2) 2000 ppm $Al(_2O_3)$+ 500 ppm $Mg(F_2)$, and 3) 500 ppm $Mg(F_2)$+1000 ppm $Ti(O_2)$+2000 ppm $Al(_2O_3)$ with the stearic acid binder/dispersant solid state coating process outlined in Example 1. The processing conditions were selected for each coating type according to Table 4. Although the initial tri-component coating mixture started out with $MgF_2$, $TiO_2$, and $Al_2O_3$, it was believed, as shown in Example 1, that the high temperature processing at 800° C. for 8 hours converted $MgF_2$ to MgO and LiF by reacting with the cathode material $Li_{0.992}Co_{0.97}Mn_{0.02}Al_{0.01}O_2$.

TABLE 4

Process conditions for coatings on $Li_{0.992}Co_{0.97}Mn_{0.02}Al_{0.01}O_2$.

| Coating type | Process conditions | |
|---|---|---|
| 500 ppm $Mg(F_2)$ + 1000 ppm $Ti(O_2)$ + 2000 ppm $Al(_2O_3)$ | 800° C. | 8 h |
| 2000 ppm $Al(_2O_3)$ + 500 ppm $Mg(F_2)$ | 800° C. | 8 h |
| 2000 ppm $Al(_2O_3)$ | 900° C. | 8 h |

The coated powder was formed into laminates, and coin cells were made from the laminates and tested as described above.

Figure 6:
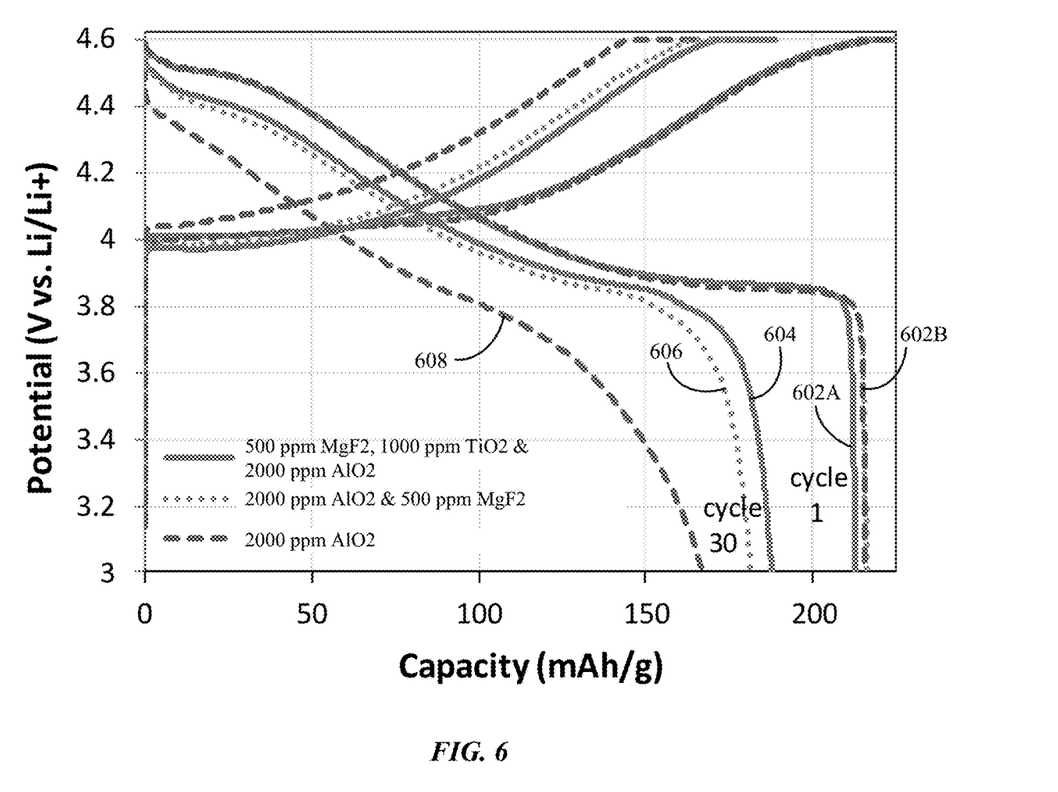
FIG. 6 illustrates voltage profile comparison of Mg—Ti—Al, Al—Mg and Al oxide coatings on $Li_{0.992}Co_{0.97}Mn_{0.02}Al_{0.01}O_2$ bimodal powder electrodes for Samples C2143, C2144, and C2084 in accordance with an embodiment of the disclosure.

FIG. 6 illustrates voltage profile comparison of three coatings including Mg—Ti—Al, Al—Mg, and Al oxide coatings on $Li_{0.992}Co_{0.97}Mn_{0.02}Al_{0.01}O_2$ core electrodes for Samples C2151, C2112, and C2115, as listed in Table 2. The performance data of the coin cells made from the three coatings after the first cycle and $30^{th}$ cycles are plotted in FIG. 6. The curves represent potential versus capacity after 1 cycle for the tri-component coating mixture of $MgF_2$, $TiO_2$, and $Al_2O_3$ containing 500 ppm $Mg(F_2)$, 1000 ppm $Ti(O_2)$, and 2000 ppm $Al(_2O_3)$ (solid line), and the single component $Al_2O_3$ coating containing 2000 ppm $Al(_2O_3)$ (dotted line). The curves represent potential versus capacity after 30 cycles for the tri-component coating mixture of $MgF_2$, $TiO_2$, and $Al_2O_3$ (solid line), the double component coating mixture of $Al_2O_3$ and $MgF_2$ containing 500 ppm $Mg(F_2)$ and 2000 ppm $Al(_2O_3)$ (dotted line), and the single component $Al_2O_3$ coating (dashed line).

The coin cells with the three coatings showed an initial capacity of about 215 mAh/g to 217 mAh/g in the first cycle and demonstrated a similar charge and discharge voltage profile. After 30 cycles of 4.6V charge/discharge, all the coin cells had reduced capacities and reduced average voltages. The coin cell with the single component coating of $Al_2O_3$ showed greater reductions in capacity and voltage than the coin cell with the double component coating of $Al_2O_3$ and $Mg(F_2)$ after 30 cycles. The coin cell containing the tri-component coating mixture of $MgF_2$, $TiO_2$, and $Al_2O_3$ as starting components revealed the best electrochemical performance in capacity and voltage among the three coatings.

Figure 7:
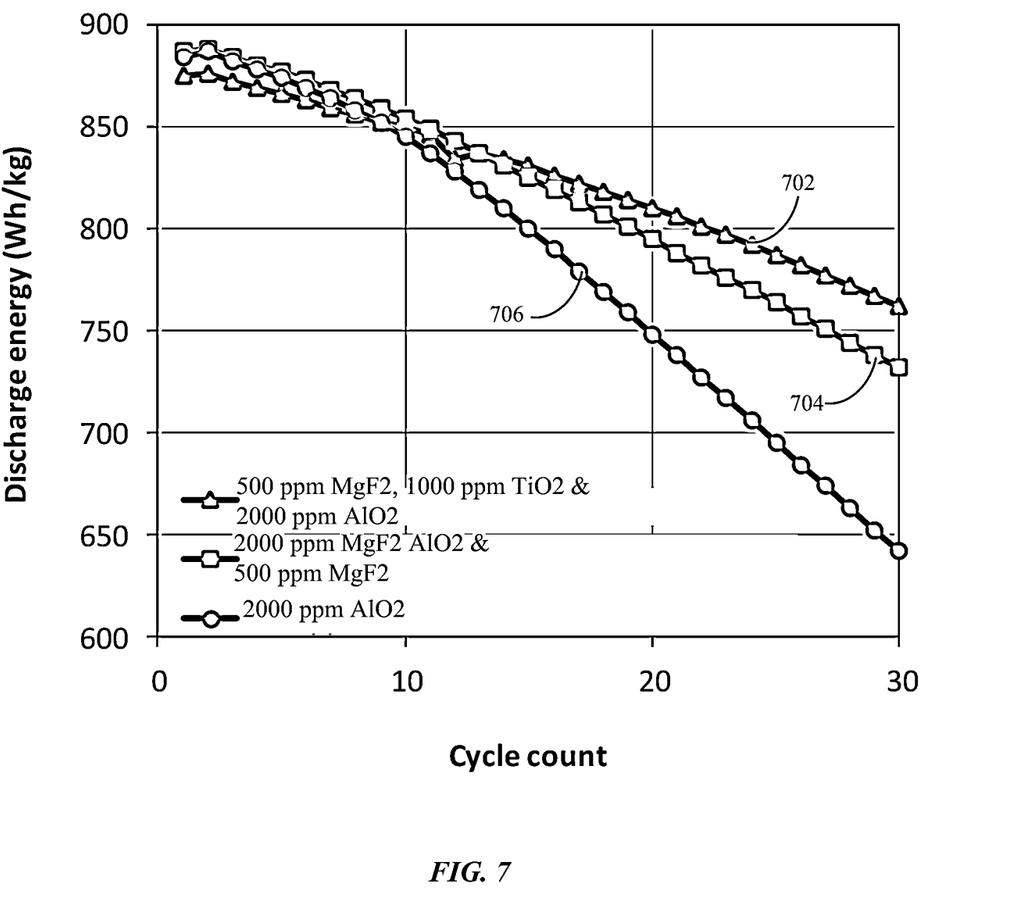
FIG. 7 illustrates comparison of discharge energy versus cycles of Mg—Ti—Al, Al—Mg and Al oxide coatings on $Li_{0.992}Co_{0.97}Mn_{0.02}Al_{0.01}O_2$ core electrodes for Samples C2151, C2112, and C2115 in accordance with an embodiment of the disclosure.

FIG. 7 illustrates discharge energy cell cycling comparison of Mg—Ti—Al, Al—Mg and Al oxide coatings on $Li_{0.992}Co_{0.97}Mn_{0.02}Al_{0.01}O_2$ core electrodes for Samples C2151, C2112, and C2115, as listed in Table 2. The curves represent discharge energy versus cycle count for the tri-component coating mixture of $MgF_2$, $TiO_2$, and $Al_2O_3$, the double component coating mixture of $Al_2O_3$ and $MgF_2$, and the single component $Al_2O_3$ coating. Although the initial energy of the coin cell for the tri-component coating mixture of $MgF_2$, $TiO_2$, and $Al_2O_3$ as starting components had a lower value, the tri-component coating mixture had the best electrochemical performance after cycling among the three coatings, including the double component coating mixture of $Al_2O_3$ and $MgF_2$ and the single component $Al_2O_3$ coating. As shown in Example 2, the double component coating mixture demonstrated better overall cycle performance than the single component coating.

Example 4—Coin Cell of $Li_{0.99}Co_{0.95}Mn_{0.03}Ni_{0.02}O_2$ Coated with a Tri-Component Coating Mixture of $MgF_2$, $TiO_2$, and $Al_2O_3$ A different core material with a composition of $Li_{0.99}Co_{0.95}Mn_{0.03}Ni_{0.02}O_2$, was coated in two separate batches 1) 3000 ppm $Al(_2O_3)$, and 2) 500 ppm $Mg(F_2)$+1000 ppm $Ti(O_2)$+3500 ppm $Al(_2O_3)$ with the stearic acid binder/dispersant solid state coating process outlined in Example 1. The processing conditions were selected for each coating type and listed in Table 2. Although the starting mixture of the tri component coating started out with $MgF_2$, $TiO_2$, and $Al_2O_3$, it was believed, as shown in Example 1, that the high temperature processing at 800° C. for 8 h converted the $MgF_2$ to MgO and LiF by reacting with the $Li_{0.99}Co_{0.95}Mn_{0.03}Ni_{0.02}O_2$.

TABLE 5

Process conditions for coatings on $Li_{0.992}Co_{0.97}Mn_{0.02}Al_{0.01}O_2$.

| ID | Coating type | Process conditions | |
|---|---|---|---|
| C2023 | 3000 ppm $Al(_2O_3)$ | 900° C. | 8 h |
| C2174 | 500 ppm $Mg(F_2)$ + 1000 ppm $Ti(O_2)$ + 3500 ppm $Al(_2O_3)$ | 800° C. | 8 h |

The coated core powder was formed into laminates. Coin cells were made from the laminates and tested as described in Example 2.

Figure 8:
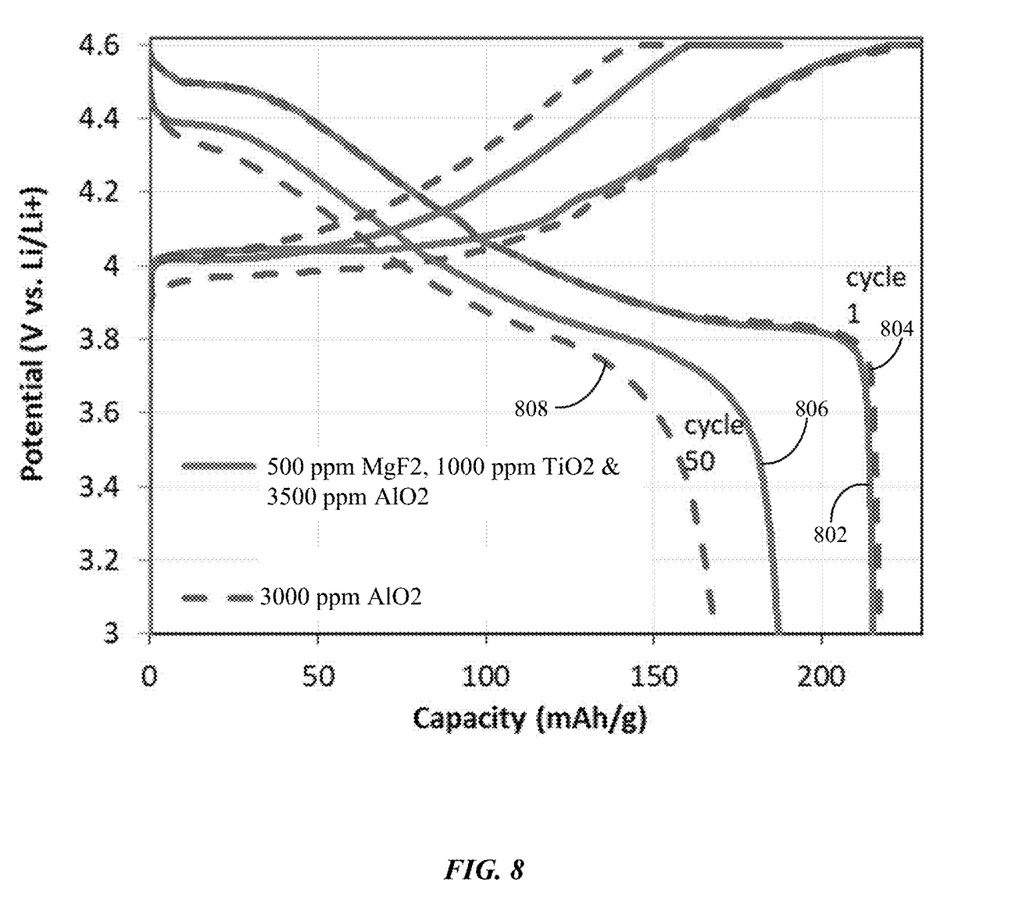
FIG. 8 illustrates voltage profile comparison of Mg—Ti—Al and Al oxide coatings on $Li_{0.992}Co_{0.97}Mn_{0.02}Al_{0.01}O_2$ core electrodes for Samples C2151, C2112, and C2115 in accordance with an embodiment of the disclosure.

FIG. 8 illustrates voltage profile comparison of Mg—Ti—Al, Al—Mg and Al oxide coatings on $Li_{0.99}Co_{0.95}Mn_{0.02}Ni_{0.02}O_2$ core electrodes for Samples C2174 and C2023, as listed in Table 5. Note that the amounts of $Al(_2O_3)$ of the samples in Table 5 were higher than Samples in Table 4. The curves represent the first cycle of coin cells having the tri-component coating mixture containing 500 ppm $Mg(F_2)$, 1000 ppm $Ti(O_2)$, and 3500 ppm $Al(_2O_3)$ (solid line) and the single component containing 3000 ppm $Al(_2O_3)$ (dotted line) at cycle 1 and cycle 50.

The coin cell with the single component coating showed an initial capacity of about 217 mAh/g after the first cycle and a similar discharge voltage profile to the coin cell with the coin cell having a tri-component coating mixture. The tri-component coating mixture had a higher initial voltage after the first cycle than after 50 cycles. After 50 cycles of 4.6V charge/discharge, the coin cells had a reduced capacity and a reduced average voltage. The coin cell with a single component coating of $Al_2O_3$ showed greater reductions in capacity and voltage than the coin cell with the tri-component coating mixture after 50 cycles. As such, the tri-component coating mixture of $MgF_2$, $TiO_2$, and $Al_2O_3$ as starting components showed better cycled electrochemical performance in capacity and voltage than the $Al_2O_3$ coating.

Figure 9:
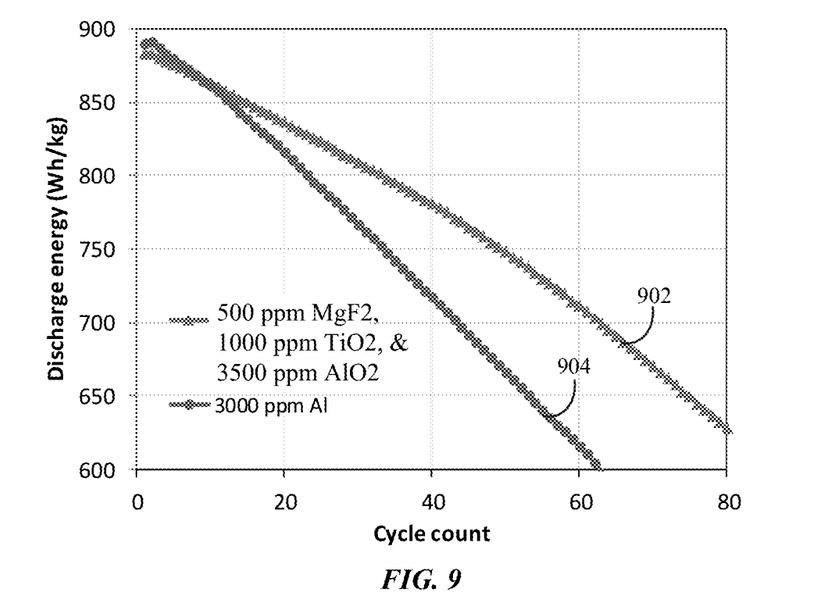
FIG. 9 illustrates comparison of discharge energy versus cycles of Mg—Ti—Al oxide coating and Al oxide coating on $Li_{0.99}Co_{0.95}Mn_{0.03}Ni_{0.02}O_2$ core electrodes for Samples C2174 and C2023 in accordance with an embodiment of the disclosure.

FIG. 9 illustrates comparison of discharge energy versus cycle counts for the coin cells having Mg—Ti—Al, and Al oxide coatings on $Li_{0.99}Co_{0.95}Mn_{0.02}Ni_{0.02}O_2$ core electrodes for Samples C2174 and C2023, as listed in Table 5. As shown in FIG. 9, a plot of the discharge energy versus cycle count were shown for the coin cell for the tri-component coating mixture of $MgF_2$, $TiO_2$, and $Al_2O_3$ as starting components. A coin cell for the single component coating $Al_2O_3$ was used as a baseline for comparison. The curves depict the discharge energy as a function of cycle count for a tri-component coating mixture of $MgF_2$, $TiO_2$, and $Al_2O_3$, processed at 800° C. for 8 hours, and a sample coated with the single component $Al_2O_3$ processed at 900° C. for 8 hours.

As shown in FIG. 9, the discharge energy decreased with the increased number of cycles. For example, the coin cell with the tri-component coating mixture had an initial discharge energy of about 875 Wh/kg at zero cycle, but had a discharge energy of about 720 Wh/kg after 60 cycles. In contrast, the coin cell with the single component $Al_2O_3$ coating had an initial discharge energy of about 880 Wh/kg at zero cycle, and a discharge energy of about 610 Wh/kg after 60 cycles, which was significantly lower than about 720 Wh/kg for the coin cell with the tri-component coating mixture. As such, the coin cell with the tri-component coating mixture had better performance with cycling than that with the single component $Al_2O_3$ coating.

The tri-component coating mixture showed the best performance among the three coatings, perhaps due to the synergistic effect of elements interacting with each other. The alumina can protect the surface as a getter or a deposit for hydrofluoric acid coming as a byproduct from the $LiPF_6$ in the electrolyte. Titanium oxide ($TiO_2$) is observed to boost the capacity and stays on the surface. Magnesium oxide (MgO) is observed to spread on and stays at the surface. The LiF product from the reaction of $MgF_2$ with the cathode material or the core material is also protective of HF.

Figure 10:
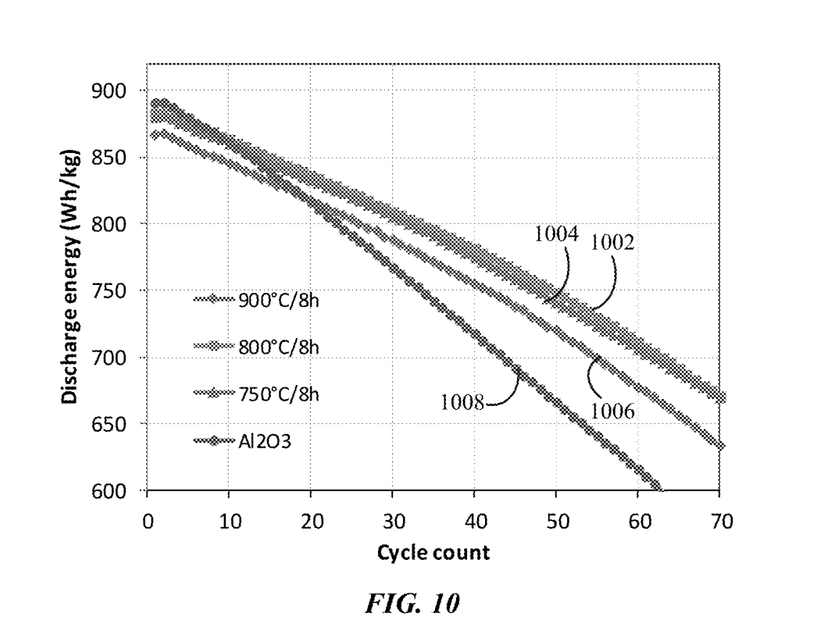
FIG. 10 shows comparison of discharge energy versus cycles of Mg—Ti—Al coating on $Li_{0.99}Co_{0.95}Mn_{0.02}Ni_{0.02}O_2$ core electrodes treated at various temperatures for Samples C2173, C2174, C2175, and C2023 in accordance with an embodiment of the disclosure.

Example 5—Coin Cell of $Li_{0.99}Co_{0.93}Mn_{0.03}Ni_{0.02}O_2$ Coated with a Tri-Component Coating Mixture of $MgF_2$, $TiO_2$, and $Al_2O_3$ Tested at Various Processing Temperatures The effect of the processing conditions on the electrochemical performance with cycling was also evaluated. FIG. 10 shows comparison of discharge energy versus cycles of the coin cells including Mg—Ti—Al coating on $Li_{0.99}Co_{0.95}Mn_{0.02}Ni_{0.02}O_2$ core electrodes that were heat treated at various elevated temperatures for Samples C2173, C2174, C2175, and C2023 in accordance with an embodiment of the disclosure. The curves depict samples coated with the tri-component coating mixture of $MgF_2$, $TiO_2$, and $Al_2O_3$ processed at 750° C., 800° C., or 900° C. for 8 hours, and a sample coated with the single component $Al_2O_3$ processed at 900° C. for 8 hours, (also as listed in Table 2). As shown in FIG. 10, sample processed at 800° C. and 750° C. had similar performance. The sample processed at 800° C. yielded slightly better performance with cycling than for the sample processed at 750° C. processing for the tri-component coating mixture of $MgF_2$, $TiO_2$, and $Al_2O_3$. The sample processed at 750° C. processing yielded better performance than the sample processed at 900° C. processing for the tri-component coating mixture. At the same processing temperature of 900° C., the tri-component coating mixture yielded better performance with cycling than the single component coating of $Al_2O_3$.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A plurality of particles, each particle comprising:
a material comprising:
0.95 to 1.30 mole fraction Li;
at least 0.60 and less than 1.00 mole fraction Co;
up to 10,000 ppm Al;
1.90 to 2.10 mole fraction O; and
up to 0.30 mole fraction M;
wherein M is at least one element selected from B, Na, Mg, P, Ti, Ca, V, Cr, Fe, Mn, Ni, Cu, Zn, Al, Sc, Y, Ga, Zr, Ru, Mo, La, Si, Nb, Ge, In, Sn, Sb, Te, and Ce; and
a surface composition comprising:
a mixture of LiF and a metal fluoride, wherein an amount of fluorine (F) is 500-5000 ppm; wherein the metal fluoride comprises a material selected from the group consisting of $AlF_3$, $CaF_2$, $MgF_2$, and $LaF_2$; and
a metal oxide comprising a material selected from the group consisting of $TiO_2$, MgO, $La_2O_3$, CaO, and $Al_2O_3$, wherein an amount of the metal oxide is 1000-20000 ppm.

2. The plurality of particles of claim 1, wherein M comprises Mn.

3. The plurality of particles of claim 1, wherein the surface composition comprises 0 to 0.2 atomic fraction Co.

4. The plurality of particles of claim 1, wherein the surface composition comprises up to 0.05 atomic fraction Mn.

5. The plurality of particles of claim 1, wherein an amount of Al and/or Ti in an accompanying oxide ranges from 100 ppm to 10,000 ppm.

6. The plurality of particles of claim 1, wherein the material comprises $$Li_aCo_{1-x-y}M_yMn_xO_d \quad (I)$$

wherein M is at least one element selected from B, Na, Mg, P, Ti, Ca, V, Cr, Fe, Ni, Cu, Zn, Al, Sc, Y, Ga, Zr, Ru, Mo, La, Si, Nb, Ge, In, Sn, Sb, Te, and Ce,
wherein $0.95 \le a \le 1.30$ per mole fraction, $0 < x \le 0.30$ per mole fraction, $0 < y \le 0.10$ per mole fraction, and $1.98 \le d \le 2.04$ per mole fraction.

7. The plurality of particles according to claim 6, wherein $0.95 \le a \le 0.99$.

8. The plurality of particles according to claim 6, wherein $0 < x \le 0.10$.

9. The plurality of particles according to claim 6, wherein $0 < y \le 0.05$.

10. The plurality of particles according to claim 1, wherein the material comprises $$Li_aCO_{1-x-y-z}Mn_xAl_yNi_zO_\delta \quad (II)$$

wherein $0.95 \le a \le 1.30$ per mole fraction, $0 < x \le 0.07$, 0 ppm $\le y \le 10,000$ ppm by weight, $0 \le z \le 0.07$ per mole fraction, and $1.98 \le \delta \le 2.04$ per mole fraction.

11. The plurality of particles according to claim 10, wherein the material comprises $Li_{0.992}Co_{0.97}Mn_{0.02}Al_{0.01}O_2$ or $Li_{0.99}Co_{0.95}Mn_{0.03}Ni_{0.02}O_2$.

12. A plurality of particles, each particle comprising:
a bulk material represented by formula:

$$Li_aCO_{(1-x-2y)}Me_x(M1M2)_yO_z \quad (III)$$

wherein Me is selected from one or more of Li, Mg, Al, P, Ca, Ti, Zr, V, Cr, Mn, Fe, Ni, Cu, Zn, Ru, Sn, B, Na, Sc, Y, Ga, Mo, La, Si, Nb, Ge, In, Sn, Sb, Te, and Ce;
wherein M1 is a metal having a +2 oxidation state selected from the group consisting of Ni, Mg, and Zn;
wherein M2 is a metal having a +4 oxidation state selected from the group consisting of Mn, Ti, Zr, and V;
wherein M1M2 represents pairs of M1 and M2; and
wherein $0 < x \le 0.30$ per mole fraction, $0 < y \le 0.40$ per mole fraction, $0.95 \le a \le 1.40$ per mole fraction, and $1.90 \le z \le 2.10$ per mole fraction; and
a surface composition comprising:
a mixture of LiF and a metal fluoride, wherein an amount of fluorine (F) is 500-5000 ppm, wherein the metal fluoride comprises a material selected from the group consisting of $AlF_3$, $CaF_2$, $MgF_2$, and $LaF_2$;
a metal oxide comprising a material selected from the group consisting of MgO, $La_2O_3$, CaO, and $Al_2O_3$, wherein an amount of the metal oxide is 1000-20000 ppm; and
an accompanying oxide comprising one or more of $Al_2O_3$ and/or $TiO_2$; and
0.001 to 0.2 atomic fraction Co.

13. The plurality of particles of claim 12, wherein the surface composition comprises up to 0.05 atomic fraction Mn.

14. The plurality of particles according to claim 12, wherein $0 < x \le 0.10$.

15. The plurality of particles according to claim 12, wherein $0 < y \le 0.05$.

16. The plurality of particles according to claim 12, wherein the metal oxide is MgO and the accompanying oxide comprises $Al_2O_3$.

17. The plurality of particles of according to claim 12, wherein the metal oxide is MgO and the accompanying oxide comprises $Al_2O_3$ and $TiO_2$.

18. A cathode comprising a cathode active material, the cathode active material comprising the plurality of particles of claim 1.

19. A battery comprising:
a cathode of claim 18;
a separator; and
an anode.

20. A method of forming the plurality of particles of claim 1, the method comprising:
coating a coating mixture comprising a metal fluoride comprising a material selected from the group consisting of $MgF_2$, $LaF_3$, $CaF_2$, and $AlF_3$ and the accompanying oxide comprising one or more of $Al_2O_3$ and/or $TiO_2$ over a plurality of cores, each core comprising the material comprising:
0.95 to 1.30 mole fraction Li;
at least 0.60 and less than 1.00 mole fraction Co;
up to 10,000 ppm Al;
1.90 to 2.10 mole fraction O; and
up to 0.30 mole fraction M;
wherein M is at least one element selected from B, Na, Mg, P, Ti, Ca, V, Cr, Fe, Mn, Ni, Cu, Zn, Al, Sc, Y, Ga, Zr, Ru, Mo, La, Si, Nb, Ge, In, Sn, Sb, Te, and Ce to produce a plurality of coated cores; and
heating the plurality of coated cores to an elevated temperature of at least 700° C. for a period of time, wherein the metal fluoride of the coating mixture reacts with the lithium cobalt oxide-based bulk material to form the surface composition comprising the lithium fluoride (LiF) and the metal oxide.

* * * * *